Dec. 4, 1951      H. THIRRING      2,577,383

SHAVING DEVICE

Filed May 5, 1948

INVENTOR:
Hans THIRRING

Patented Dec. 4, 1951

2,577,383

UNITED STATES PATENT OFFICE 2,577,383

SHAVING DEVICE

Hans Thirring, Vienna, Austria

Application May 5, 1948, Serial No. 25,225
In Austria May 12, 1947

2 Claims. (Cl. 30—43)

This invention relates to shaving devices, and more particularly to electrically driven dry-shaving devices.

Various forms of electrical shaving devices are known, using an oscillating or rotating cutting system co-operating with a stationary cutting system which is provided in the casing surrounding the moving cutter. The cutting capacity of such devices is determined by their characteristic mechanical values, e. g. the operative length of cutting edges and the effective cutting speed. The said values of the known devices, however, are such as to limit the cutting capacity to such an extent that dry-shaving involves a considerable loss of time, as compared with the simple method using soap and safety razor.

If L denotes the operative length of cutting edges, $v$ denotes the effective cutting speed, that is the operative component of speed perpendicular to the cutting edge, and $n$ the number of revolutions of the motor, there is obtained a characteristic $$K = \frac{L \cdot v}{n} \text{ (sq. in.)}$$

indicating the area over which the cutting edges pass at each revolution of the motor, thus providing a value for comparison with respect to the efficiency of the shaving devices.

All the above mentioned systems with oscillating cutting edges are subjected to the defect of too small a cutting speed, even in case of an advantageous length of the cutting edges, while the rotating systems, although the length of the cutting edges is a sufficient one and the cutting speed being seemingly great, the shape and the position of their stationary cutting members are inadequate, since it consists of a system of apertures or at best of short slots, the angular position of which with respect to the moving cutting edges is so disadvantageous that the effective cutting speed resulting from the relative movement of the cutting edges is a very small one.

There are other forms of such devices known, using cutting systems provided at the end surface of the cutting block, which devices show comparatively long slots and also a more adequate position of the two cutting systems with regard to each other, but the rotation cutting head has very short cutting edges as a consequence of its special shape.

Thus the improprieties of the known devices as mentioned at the beginning result from the fact that it was not possible heretofore to provide at the same time adequate, that is great values of L and $v$, and consequently no maximum cutting capacity was obtained.

Other considerable defects of all the known systems consist in the fact that slots provided in the casing of the shaving head are extremely small and consequently it is very troublesome and takes up much time to catch all the hair, thus shaving directly becomes an exercise of patience. Another defect is to be seen in the fact that the stationary cutting edges are formed by the perpendicular sides of the slots, resulting in the remaining bristles of the beard having a length at least equal to the thickness of wall of that casing.

An object of my invention is to provide an electrical shaving device comprising a stationary cylindrical casing provided with a series of substantially parallel slots, said slots being arranged in an area in the shape of a longitudinal strip and extending over the entire effective width of the casing, and comprising a power-driven cylindrical cutter rotatably arranged within said casing and provided with a multiple-thread helical cutting system of steep pitch and wherein said slots of the casing are inclined in the same sense as the cutting means of the cutter, their inclination being only a little less steep than that of said cutting means. By means of said advantageous arrangement maximum values of the operative length L of the cutting edges as well as of the effective cutting speed $v$ are obtained for the first time, thus very remarkably improving the cutting capacity of my device compared to the amount of the capacity of the known devices, and that without increasing the number of revolutions of the motor, as clearly comes forth from the formula of the characteristic K. Furthermore there are taken arrangements in my device for readily and positively catching up all the hair, and moreover to reduce the length of the remaining bristles to a fraction of those left behind by the hitherto known devices.

In accordance with the invention the slots forming the stationary cutting system are wedge-like enlarged at their ends, thus the wider end of the slots are foreward directed with regard to the working stroke of the device, whereby even that hair is caught which is not directly in the reach of the slot.

Furthermore the cutting edges of the slots provided in the casing of the shaving head are tapered such as to V-like enlarge towards the outer surface of the casing, thus the inner edges of the slots adjacent to the revolving core form cutting edges, resulting in a further advantage in the shaving operation.

Particularly the said tapering is adapted to improve the shaving by enabling the skin to closely press into the flat troughs of the slots, thus rendering it possible to cut off the hair possibly close to the skin and the remaining bristles of beard are considerably shorter than the thickness of the casing wall, resulting in a closer shave.

Preferably, the cutting edges arranged on the rotatable cutter are also of acute angular shape.

The said cylindrical cutter revolves within a casing preferably of cylindrical shape and being made of extremely thin material. A system of slots being parallel to each other and constituting portions of a multiple-thread are arranged in an area in the shape of a longitudinal strip of a width of approximately ¼ of the circumference of the casing corresponding to the effective width of the latter in such a manner, that said slots extend without interruption over the entire width of said longitudinal strip. According to the invention, the pitch of said slots is of the same direction and only little less inclined than the pitch of the cutting edges of the rotary cutter, i. e. the slots have also a steep pitch. Furthermore, preferably, the pitch of said slots is chosen in such a manner, that said two cutting systems are at an acute angle of approximately 15–25°, preferably 20°, relative to each other.

Preferably, after the completion of the cylindrical shape of the casing, the cutting edges of the latter are sharpened by turning, grinding or polishing from the inside; if desired, the rotary cutter may be fitted exactly into the casing at the same time.

Preferably the diameter of the cylindrical cutter is somewhat smaller than the inside diameter of the casing so as to reduce frictional losses. The cylindrical cutter journalled in the casing with lateral play is urged by resilient means against said springs. Preferably, said cylindrical cutter is driven by a flexible shaft.

Except the operating area of the casing, its shape may differ from the cylindrical one, for instance for the accommodation of the spring bearings of the shaft.

In order to reduce raising of temperature caused by friction, the casing made of thin sheet metal may be surrounded by a jacket of greater thickness of wall and having a great capacity for conduction of heat, such jacket has to clear off that portion of the casing which is provided with the said slots. Alternatively the thickness of wall of the casing may be increased at that portion which does not contain the said slots, thus at the same time increasing the strength of the casing.

A preferred embodiment of my invention is illustrated by way of example in the accompanying drawing, in which.

Figures 1, 2, 3:
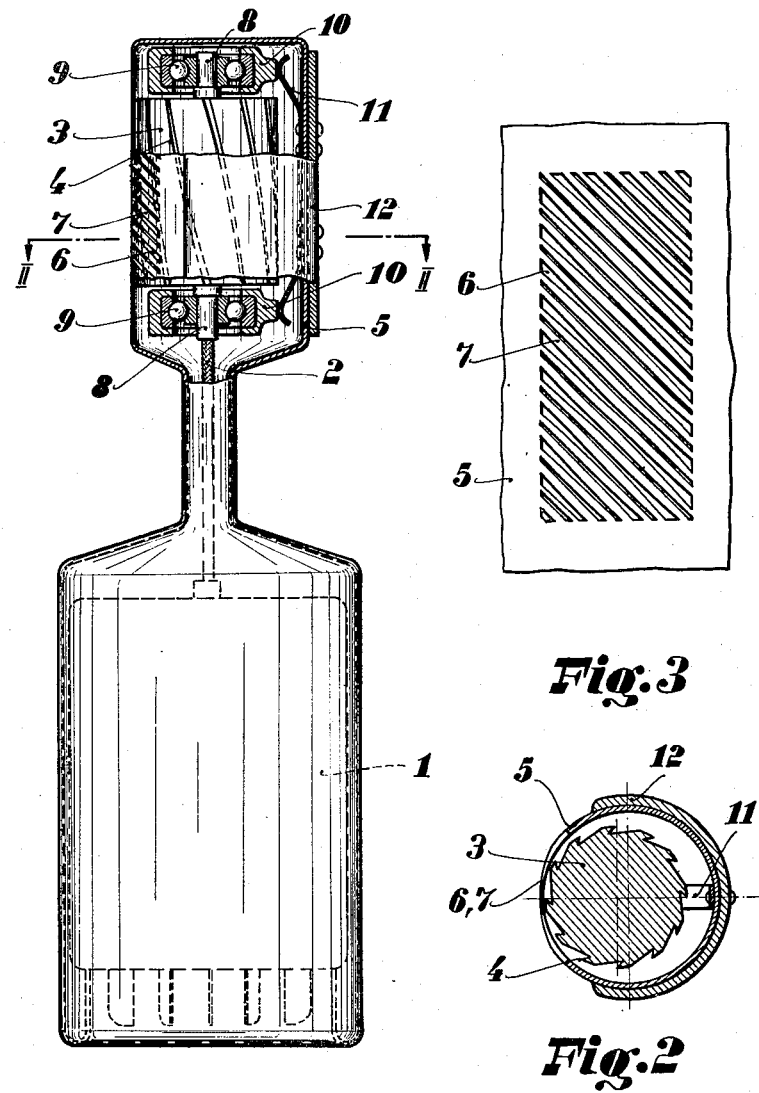
Fig. 1 is an elevation of the shaving device partly in longitudinal section.
Fig. 2 is a cross-section taken on the line II—II of Fig. 1.
Fig. 3 is a view of the outer cutting member on a larger scale.

Referring to Fig. 1 an electromotor 1 is encased in a casing serving as a handle, to the flexible shaft 2 of the electromotor is fixed a cutter core or block 3 provided with backed off helical cutting edges 4. The block 3 is surrounded by a cylindrical casing 5 constituting the outer cutting member and showing slots 6 arranged in parallel such as to form acute angles with the cutting edges 4.

The journals 8 of the cylindrical cutter 3 are engaged with ball bearings 9, the casings 10 of which are subject to the lateral pressure of the spring 11 riveted to the cylindrical casing 5 at a point diametrically opposite to the slots 6. Thus the rotary cutter 3 having a diameter slightly smaller than the inside diameter of the casing 5 is resiliently held under slight pressure against the slots 6 of the casing, so that a perfectly fitting engagement of the two cutting systems is assured.

As shown in Fig. 2 the cutter block 3 is eccentrically arranged with regard to the outer cutting member 4 contacting its internal surface at a portion where the thickness of wall of the member 5 is reduced compared with the remaining portion of the wall.

The member or casing 5 is made of thin sheet metal, for example steel sheet metal, the wall of which is even thinner at the place where the slots 6 are located. The remaining portion of the casing 5 outside the area containing the slots is embraced by a jacket 12 of heat conducting material the wall of which is of greater thickness.

The inclined slots 6 of the member 5 (Fig. 3) are wedge-shaped enlarged each at one of its ends. In order to obviate a critical weakening of the ribs 7 between the slots 6, the wedge-shaped enlargements of the slots are alternatively provided at opposite ends of the respective slots, at the same time enabling the device to be used in both directions of movement. Preferably the cross-sections of the slots are V-shaped and the outer edges of the ribs 7 may be rounded off.

Means are provided in the usual way to remove the cut hair out of the device when the member 5 is detached from the latter. Furthermore a suitable insulation is provided to protect the user of the device against contact with current-carrying parts in case of cable faults or damage of certain parts of the device.

Due to its high cutting capacity the device according to this invention is suitable not only for private use but for professional barbers too. For the latter purpose a form of the device may be used comprising only the shaving head with a flexible shaft which may be connected with the usual motor for driving the hair cutting machines.

Having now fully described and ascertained the nature of my invention and in what manner it is to be performed, I declare that what I claim is:

1. A shaving device comprising: a casing, and a power-driven substantially cylindrical cutter rotatably arranged in said casing, said cutter being provided at its circumference with multiple-thread helical cutting means having a steep pitch, a portion of the wall of said casing being provided with a series of slots being substantially parallel to each other and being arranged in an area substantially in the shape of a longitudinal strip, said slots constituting portions of a multiple thread having a pitch little less than the pitch of said cutting means, each of said slots being in the shape of a wedge tapering from a comparatively broad portion at one of its ends towards a comparatively thin portion at its other end, the broad portions of alternate slots being arranged at one side of said strip, and the thin portions of the remaining alternate slots being arranged at the same side of said strip between said forementioned broad portions.

2. In a shaving device as claimed in claim 1, said slots and said cutting means being at an angle of less than 26° relative to each other.

HANS THIRRING.

REFERENCES CITED

The following references are of record in the file of this patent:

UNITED STATES PATENTS

| Number | Name | Date |
|---|---|---|
| 1,247,828 | Halterman | Nov. 27, 1917 |
| 1,251,925 | Scheithe | Jan. 1, 1918 |
| 2,182,067 | Bruecker | Dec. 5, 1939 |
| 2,216,673 | McGall | Oct. 1, 1940 |
| 2,234,894 | Bruecker | Mar. 11, 1941 |
| 2,324,070 | Dalkowitz | July 13, 1943 |
| 2,341,665 | Scully | Feb. 15, 1945 |

FOREIGN PATENTS

| Number | Country | Date |
|---|---|---|
| 69,564 | Norway | Aug. 27, 1945 |